(12) United States Patent
Schexnaider

(10) Patent No.: US 7,374,327 B2
(45) Date of Patent: May 20, 2008

(54) LIGHT PANEL ILLUMINATED BY LIGHT EMITTING DIODES

(76) Inventor: Craig J. Schexnaider, 3280 Delaware, Beaumont, TX (US) 77703

( * ) Notice: Subject to any disclaimer, the term of this patent is extended or adjusted under 35 U.S.C. 154(b) by 0 days.

(21) Appl. No.: 11/093,192

(22) Filed: Mar. 29, 2005

(65) Prior Publication Data
US 2005/0219860 A1    Oct. 6, 2005

Related U.S. Application Data

(60) Provisional application No. 60/557,848, filed on Mar. 31, 2004.

(51) Int. Cl.
*F21V 7/04* (2006.01)
(52) U.S. Cl. .................. 362/613; 362/631; 362/394
(58) Field of Classification Search .............. 362/612, 362/613, 610, 623, 631, 183, 295, 394; 40/546, 40/547, 570
See application file for complete search history.

(56) References Cited

U.S. PATENT DOCUMENTS

| | | | |
|---|---|---|---|
| 3,892,959 A | 7/1975 | Pulles | |
| 4,466,208 A * | 8/1984 | Logan et al. | 40/544 |
| 5,027,258 A | 6/1991 | Schoniger et al. | |
| 5,151,679 A * | 9/1992 | Dimmick | 340/326 |
| 5,177,889 A * | 1/1993 | Ching Hwei | 40/204 |
| 5,276,591 A * | 1/1994 | Hegarty | 362/601 |
| 5,375,043 A | 12/1994 | Tokunaga | |
| 5,641,219 A | 6/1997 | Mizobe | |
| 5,786,665 A * | 7/1998 | Ohtsuki et al. | 313/512 |
| 5,842,297 A | 12/1998 | Tung | |
| 6,341,440 B1 * | 1/2002 | Lee | 40/546 |
| 6,481,130 B1 * | 11/2002 | Wu | 40/546 |
| 6,539,656 B2 | 4/2003 | Maas et al. | |
| 6,840,646 B2 * | 1/2005 | Cornelissen et al. | 362/606 |
| 6,874,922 B2 * | 4/2005 | Matsuura et al. | 362/497 |
| 6,966,684 B2 * | 11/2005 | Sommers et al. | 362/604 |

* cited by examiner

*Primary Examiner*—Sandra O'Shea
*Assistant Examiner*—Gunyoung T. Lee

(57) ABSTRACT

A flat planar light fixture formed of a translucent panel with for the transmission of light is illuminated by a plurality of high brightness LEDs disposed along the edges thereof. A layer of reflective material on a back surface of the panel facilitates reflection and dispersion of light that occurs within the panel through a front surface thereof. The LEDs are powered by low-voltage direct current and coupled with an emergency backup battery that is maintained in a charged condition by household current. The light fixture may be operatively connected with a signal receiver that controls the light intensity and turns the LEDs on and off responsive to signals transmitted from a remote signal transmitter. The LEDs may be provided in different colors to allow the user to vary the color of illumination. The light fixture may also be operatively connected with an alarm system.

10 Claims, 2 Drawing Sheets

LIGHT PANEL ILLUMINATED BY LIGHT EMITTING DIODES

CROSS REFERENCE TO RELATED APPLICATION

This application claims priority of U.S. Provisional application Ser. No. 60/557,848, filed Mar. 31, 2004.

BACKGROUND OF THE INVENTION

1. Field of the Invention

This invention relates generally to lighting fixtures, and more particularly to a lighting fixture illuminated by a plurality of light emitting diodes wherein the light that is within the panel is transmitted through a front surface thereof.

2. Background Art

Conventional ceiling mounted light fixtures typically employ incandescent or fluorescent light sources. Incandescent illumination systems have significant disadvantages since they consume a lot of power and produce a great deal of heat, are relatively inefficient and fragile, and require frequent replacement. Systems using fluorescent light sources also have several disadvantages since they require complicated circuitry including a ballast reactor (a coil of wire wrapped around a heavy iron core), and require substantial space for the location of the fluorescent lamps and circuitry thus increasing the profile of the fixture. Fluorescent lighting systems also consume a lot of power, are relatively inefficient, are heavy and fragile, and require frequent replacement.

Light Emitting Diodes or "LEDs" have been previously employed in the field of illuminated sign systems, and edge lighting systems, for example, luminous signs for display and advertising purposes and directional signage such as emergency exit signs. Typically, LED signs include a panel surface having graphics applied thereto or etched to define indicia and generally light is direct light from the light source onto either the viewing surface of the panel or through a translucent panel disposed behind the graphic information to be viewed. Edge lighting systems, on the other hand, use a light source to inject light into the edge of a transparent or translucent panel, whereby the panel is caused to glow and any graphics in contact with the panel are made apparent. For example, a message painted on the back side of a panel viewed from the front can be illuminated in this manner, or a panel can be caused to glow generally, the indicia being defined by or between opaque areas on the front side.

Light emitting diodes or "LEDs" are popular for use in lighting fixtures such as exit lighting primarily because of their longer service life. They also generally require lighter duty power supplies and battery backups. Maintenance costs are greatly reduced because LEDs last significantly longer before degrading to half power.

There are several patents directed toward various illuminated sign systems, and edge lighting systems employing light emitting diodes or "LEDs".

Pulles, U.S. Pat. No. 3,892,959 discloses an edge-lighted panel having a number of light sources couple to a length of flexible wiring which is arranged to be removably affixed about the peripheral edge of the panel, with the light sources disposed within light receiving cavities in the marginal portion of the panel.

Schoniger et al, U.S. Pat. No. 5,027,258 discloses an illuminated display unit such as a board with a house number thereon or an advertising billboard, having a light guide panel. At least one electrical illuminating element is arranged in the vicinity of at least one lateral limiting edge thereof. The light guide panel serves for illuminating logo symbols, which are preferably in the form of film or of vapor coated layers, on the light guide panel. At least one of the lateral limiting edges of the light guide panel is provided with a light guide batten whose thickness is in excess of the thickness of the light guide panel and at least one of the illuminating elements is mounted in the batten. The transition between the light guide batten and the light guide panel is designed so as to have a high optical conductivity or transitivity. The external surfaces of the light guide batten are provided at least partly with an inwardly reflecting layer. This makes it possible for the light of the illuminating elements in the form of LED's with a large diameter, to be fully introduced in substantially thinner light guide panels in order to reduce costs and weight.

Hegarty, U.S. Pat. No. 5,276,591 discloses an illuminated sign system using high brightness LEDs and a translucent graphic panel with suitable opacity for the transmission of light. The graphic panel is illuminated by light from the LEDs which is injected into the edge of the graphic panel causing graphics applied to a surface of the graphic panel to become illuminated.

Tokunaga, U.S. Pat. No. 5,375,043 discloses a lighting unit of an indirect type, capable of varying the luminance and color of illumination with respect to a target to be lit, and further capable of using itself as a display unit. The lighting unit comprises a light guide plate having one side fashioned into an uneven surface or a reflective surface; a plurality of light emitting diodes for supplying a light to the light guide plate, the light derived from the diodes being dispersed through the light guide plate; and a control section which controls actions including blinking of the light emitting diodes. At least a part of the diodes is intended to emit a light different in color from that of the others so that the color or blinking of illumination can be arbitrarily varied through the control by means of the control section.

Mizobe, U.S. Pat. No. 5,641,219 discloses an illuminating device in which light is introduced mainly from a light source provided at a peripheral portion of a light emitting surface thereby illuminating the light emitting surface. The illumination of the light emitting surface is kept uniform irrespective of a shape of the light emitting surface, a type of the light source, a number of light sources and a mounting position of the light sources. The device may be used as a display device.

Tung, U.S. Pat. No. 5,842,297 discloses a luminant sign having a base including a pair of opposed casings and a image plate made of transparent acrylic resin engaged with the base. The base has a circuit board with a plurality of illuminators disposed therein. A front face and a rear face of the image plate have a number of display areas defined thereon by peripheral grooves of pictures or words. Each display area has a plurality of reflective surfaces formed therein in directions non-parallel to the beam directions of the illuminators whereby each display area of the image plate will achieve a uniform intensity.

Maas et al, U.S. Pat. No. 6,539,656 discloses a luminaire and light emitting panel comprising a relatively thin and flat light-emitting panel having a light-emitting window and, opposite the light-emitting window, a rear wall with opposed edge surfaces. At least one of the edge surfaces is light transmitting and associated with a plurality of light sources. Light originating from the light sources is spread in the panel. The device is characterized in that a plurality of deformities is provided in the panel for extracting light from the panel via the light emission window. The deformities are clustered so as to form at least one light symbol. The configuration of the clusters of deformities corresponds to the shape of the light symbol. Preferably, the luminaire has a first and a second light-transmitting edge surface, with respectively, a first and a second plurality of light sources being associated with the surfaces. A first cluster of deformities only couples light from the first light source out of the panel, thereby forming a first light symbol, while a second cluster of deformities only couples light from the second light source out of the panel, thereby forming a second light symbol, independently of the formation of the first light symbol. The luminaire provides independent lighting and coloring possibilities of light symbols in a single-panel luminaire.

Light emitting diodes or "LEDs" have not been widely accepted as a general lighting source as a replacement for incandescent or fluorescent light sources because, until just recently, they were known to have a very poor luminous efficacy and were incapable of providing sufficient brightness. As used herein, the term "luminous efficacy" means the amount of luminous flux (light) measured in lumens produced for each watt of electrical input power; and the term "efficiency" means the watts of visible energy as a ratio of the energy consumed in watts. When LEDs were first commercialized in the early 1960s, they then featured a luminous efficacy on the order of 0.15 lumen ("lm") per watt ("lm/W"). Not until the development of isoelectronically doped indirect semiconductors in the mid-1970s did diodes become brighter and more varied in color. Red, yellow, and green diodes so manufactured could produce a luminous efficacy in the range of 1 lm/W; single heterostructure diodes raised the efficacy to a range of 2 lm/W.

The recent development and plummeting costs of new semiconductor materials have made it possible to produce low cost, "high brightness" light emitting diodes, or LEDs, that provide a new alternative to conventional filament light bulbs and fluorescent tubes as a light source in ceiling light panels. LED efficiency (watts of visible energy as a ratio of the energy consumed in watts) is advancing at a rapid rate compared to conventional incandescent and fluorescent lighting. For example, Lumileds Lighting LLC, of San Jose, Calif. produces a Luxeon™ Star line of ultra bright LEDs whose brightness exceeds previous LEDs by a factor of 5 to 10 times or even more. They can also produce a white light with a luminous efficacy in the range of up to 30 lm/W. As used in the context of the present invention, the term "high brightness LED" means a light emitting diode having a luminous efficacy of at least 30 lm/W.

The present invention is distinguished over the prior art in general, and these patents in particular by a flat planar light fixture formed of a translucent panel for the transmission of light that is illuminated by a plurality of high brightness LEDs disposed along the edges thereof. A layer of reflective material on a back surface of the panel facilitates reflection and dispersion of light that occurs within the panel through a front surface thereof. The LEDs are powered by low-voltage direct current through a rectifier and can be coupled with an emergency backup battery that is maintained in a charged condition by standard current. The light fixture may be operatively connected with a signal receiver that controls the light intensity and turns the LEDs on and off responsive to signals transmitted from a remote signal transmitter. The LEDs may be provided in different colors to allow the user to vary the color of illumination. The light fixture may also be operatively connected with an alarm system.

SUMMARY OF THE INVENTION

It is therefore an object of the present invention to provide a light fixture panel illuminated by a plurality of high brightness LEDs that is compact, durable and efficient in operation.

It is another object of this invention to provide a light fixture panel illuminated by a plurality of high brightness LEDs that operates on low voltage direct current which will reduce the electrical power required to provide illumination in a home or office.

Another object of this invention is to provide a light fixture panel illuminated by a plurality of high brightness LEDs that will reduce air conditioning costs associated with cooling the air that has been heated by conventional incandescent bulbs and fluorescent light fixture ballasts.

Another object of this invention is to provide a light fixture panel illuminated by a plurality of high brightness LEDs that has a significantly longer service life than conventional incandescent and fluorescent light fixtures and eliminates frequent replacement of ballasts and/or bulbs.

Another object of this invention is to provide a ceiling light fixture illuminated by a plurality of high brightness LEDs that has a significantly smaller thickness and is much lighter in weight than conventional incandescent and fluorescent light fixtures, and simplifies installation and wiring.

Another object of this invention is to provide a ceiling light fixture illuminated by a plurality of high brightness LEDs that is sized and shaped to be retrofit into conventional ceiling suspended fluorescent and incandescent light fixture frames.

Another object of this invention is to provide a light fixture illuminated by a plurality of high brightness LEDs that may be coupled with an emergency backup battery that is maintained in a charged condition by household current.

Another object of this invention is to provide a light fixture illuminated by a plurality of high brightness LEDs that may be coupled with an alarm system to provide a visual alarm signal in the event of an emergency situation.

Another object of this invention is to provide a light fixture illuminated by a plurality of high brightness LEDs that may be operated by a remote control signal to control the light intensity and switch the LEDs on and off.

A further object of this invention is to provide a light fixture illuminated by a plurality of high brightness LEDs in various different colors that may be controlled to allow the user to vary the color of illumination to produce customized and dynamic lighting effects.

A still further object of this invention is to provide a light fixture illuminated by a plurality of high brightness LEDs that is simple in construction, inexpensive to manufacture and rugged and reliable in operation.

Other objects of the invention will become apparent from time to time throughout the specification and claims as hereinafter related.

The above noted objects and other objects of the invention are accomplished by a flat planar light fixture formed of a translucent panel for the transmission of light that is illuminated by a plurality of high brightness LEDs disposed along the edges thereof. A layer of reflective material on a back surface of the panel facilitates reflection and dispersion of light that occurs within the panel through a front surface thereof. The LEDs are powered by low-voltage direct current and may be coupled with an emergency backup battery that is maintained in a charged condition by household current. The light fixture may be operatively connected with a signal receiver that controls the light intensity and turns the LEDs on and off responsive to signals transmitted from a remote signal transmitter. The LEDs may be provided in different colors to allow the user to vary the color of illumination. The light fixture may also be operatively connected with an alarm system.

DESCRIPTION OF THE PREFERRED EMBODIMENTS

Figure 1:
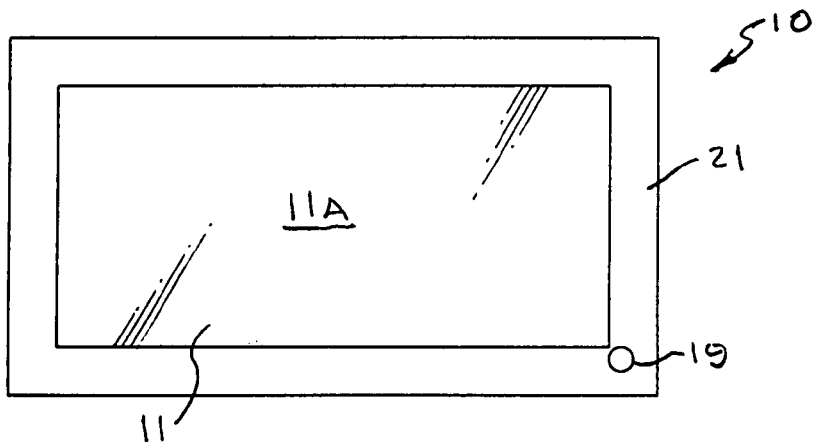
FIG. 1 is a front elevation view of the light fixture in accordance with the present invention.

Referring to the drawings by numerals of reference, there is shown in FIGS. 1 and 2, a preferred light fixture apparatus 10 in accordance with the present invention. The light fixture is shown in and described for purposes of example, as a ceiling fixture adapted to be fitted into or onto the ceiling, however, it should be understood that the fixture may be supported in other ways such as mounting on a wall or other suitable support.

The fixture 10 has a flat generally rectangular panel 11 formed of a lightweight translucent material for the transmission of light, surrounded on its outer periphery by a frame 21. In a preferred embodiment, the panel 11 is relatively thin, for example from about 3/8" to 1/2" in thickness, and in the embodiment for use as a ceiling fixture may be from about 10 inches to about 24 inches wide and about 4 feet long. They may also be provided in smaller segments or in elongate narrow strips. It should be understood that the fixture 10 may also be sized to be retrofit into existing conventional ceiling suspended fluorescent or incandescent fixture frames.

The panel 11 has a front surface 11A and a back surface 11B and opposed flat peripheral side edges 11C. The back surface 11B is provided with a layer of high reflectivity material 12, which may be a paint coating or sheet of material applied to the back surface to improve the efficiency of the internal reflections within the panel and facilitate uniform illumination. The peripheral side edges 11C may also be provided with a layer of high reflectivity material to further improve efficiency of internal light within the panel. The front surface 11A of the panel is preferably smooth and may be polished for optimal transmission of light. Optionally, the front or back surfaces of the panel may optionally be provided with an uneven surface finish, for example etched or sanded, to provide a diffuser for the light. Diffusing the light helps to spread the LED beams, however, diffusers attenuate the light from the source, and thus adversely affect efficiency. The panel 11 imaterial may also contain a sufficient amount of phosphor material 23 to facilitate radiation of the light.

Figure 2A:
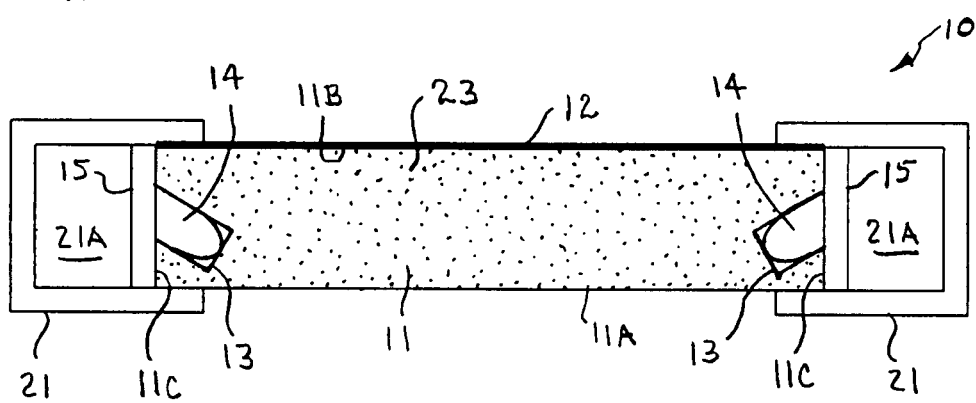
FIG. 2A is a cross sectional view of the light fixture showing, somewhat schematically, the panel and frame with LEDs installed in lateral side edges of the panel at an angle with respect to the front surface of the panel.
Figure 2B:
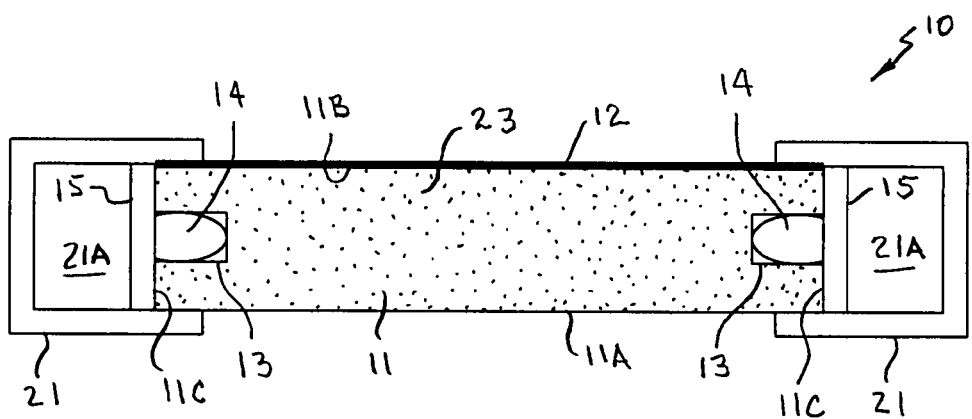
FIG. 2B is a cross sectional view of the light fixture showing, somewhat schematically, the panel and frame with LEDs installed in lateral side edges of the panel.

A plurality of inwardly extending blind holes 13 are formed in the opposed peripheral side edges of the panel 11 in longitudinally spaced apart relation. The holes 13 may be disposed at an angle with respect to the front surface 11A of the panel 11 as shown in FIG. 2A, or may be disposed generally parallel to the front surface of the panel as shown in FIG. 2B. A high brightness LED 14 is received in each blind hole. The LEDs 14 may be secured in the holes 13, by frictional engagement or other suitable mounting means. Alternatively, the LEDs 14 may be mounted on the opposed peripheral side edges of the panel 11 without insertion into holes by other mounting means such that, when illuminated, light therefrom is injected into the panel material from the peripheral edges and reflected internally within the panel causing the light to become diffused. The number of LEDs used depends on the size of the panel, the desired brightness and the intensity of the LED used.

The frame 21 has a generally U-shaped transverse cross section to define a channel 21A surrounding the opposed peripheral edges 11C of the panel 11, to accommodate the LEDs 14 whereby the LEDs may be wired together, or to accommodate one or more circuit board strips 15 on which the end terminals of the LEDs 14 may be mounted in longitudinally spaced apart relation corresponding to the hole spacing.

The LEDs 14 may be mounted on a printed circuit board in a conventional manner, e.g., by soldering their leads to the printed circuit board such that the LEDs are appropriately oriented to correspond to the spacing of the holes 13. The printed circuit boards or strips can be retained on the panel by attaching them to its peripheral side edges, or retained in the frame by supporting or mounting them on an interior support surface in the frame.

The electrical terminals or leads of the LEDs 14 are electrically connected through the circuit board 15 to a low voltage direct current electrical supply such as a rectifier or LED "driver" 16, which is in turn connected with the common 120 v AC household electrical source 17. The LED "driver" 17 rectifies and regulates the common 120 v AC current down to supply polarized constant DC electrical current to the LEDs 14, such as 12 v or 24 v DC. LED drivers are commercially available that will fit into a standard 4" junction box.

In a preferred embodiment, a rechargeable backup battery 18 is provided in the power supply circuitry and connected with the standard 120 volt AC to be constantly charged thereby to provide uninterruptible power to the LEDs in the event of a power failure. The backup battery and LED driver may be retrofitted into a conventional light fixture box, or may be located outside of the fixture.

In another preferred installation, the rechargeable backup battery 18 and rectifier 16 are located remote from the fixture and connected with the fixture by 12 volt DC wiring. This arrangement allows 12 volt DC wiring to be used in the building or area in which the fixtures are mounted, rather than the standard 120 volt AC light wiring system.

When the LEDs 14 are on, the light therefrom is injected into the panel material from the peripheral edges and reflected internally within the panel causing the light to become diffused. The light is transmitted through the panel and emitted through the front surface 11A of the panel 11 in a concentrated manner under the influence of total internal reflection.

A remote control signal receiver 19 is connected with the power supply circuitry and the LED driver or rectifier to control the operation of the LEDs in response to control signals transmitted by a hand-held remote control unit 20. The signal receiver 19 and remote control unit 20 allow the LEDs to be turned on and off and the light intensity to be selectively controlled from a remote location. The signal receiver 19 may be mounted on the frame 21, as shown in FIG. 1, or may be located outside of the fixture adjacent to the LED driver. The signal receiver 19 may also be connected to control a single light fixture, or a group of light fixtures such as in a hallway.

The high brightness LEDs 14 may also be provided in a plurality of various different colors that may be controlled to vary the color of illumination and thereby produce customized and dynamic lighting effects. Thus, by switching various groups of LEDs on or off or dimming them it is possible to produce a large number of different colors and hues.

Figure 3:
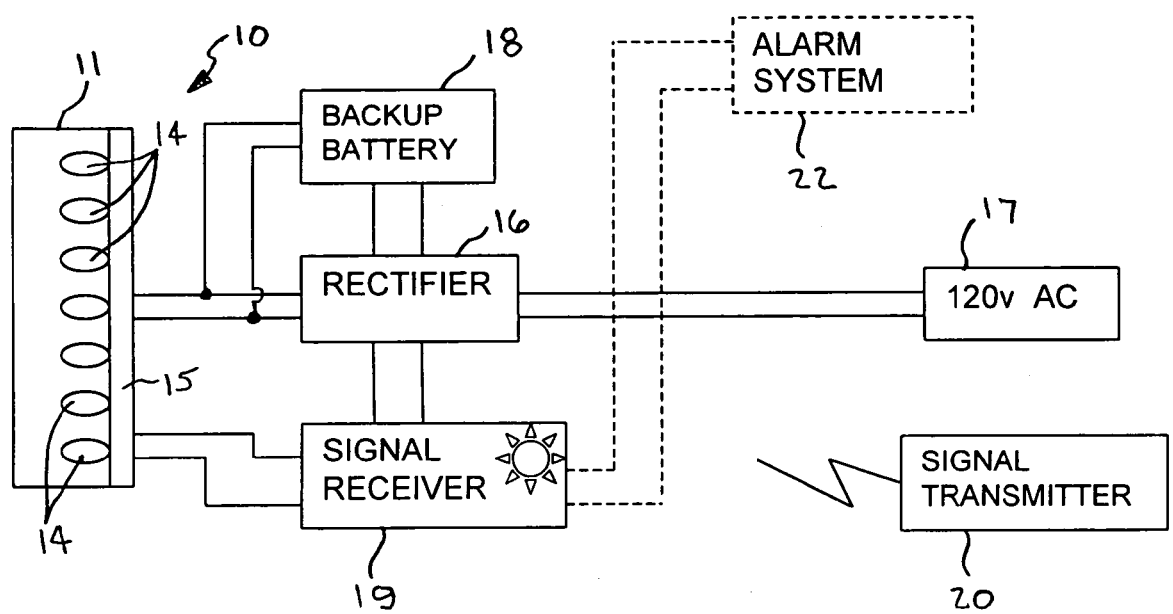
FIG. 3 is a schematic block diagram of the power supply circuitry of the light fixture and showing, somewhat schematically a plurality of LEDs installed in a side edge of the panel.

As indicated in dashed line in FIG. 3, the fixture 10 may also be electrically connected with an alarm system, such as a burglar alarm, smoke detector, motion sensor, etc., wherein various groups of LEDs may be switched on or off to produce a different color or hue to provide a visual alarm signal in the event of an emergency situation.

While this invention has been described fully and completely with special emphasis upon preferred embodiments, it should be understood that within the scope of the appended claims the invention may be practiced otherwise than as specifically described herein.

The invention claimed is:

1. A lighting fixture illuminated by light emitting diodes for providing general lighting illumination in a home or office, comprising:
    a generally flat planar panel formed of translucent material having a front surface, a back surface, and opposed peripheral side edges;
    a plurality of inwardly extending apertures formed along at least two of said peripheral side edges in longitudinally spaced apart relation, wherein said apertures extend inwardly at an acute angle with respect to said panel front surface;
    a plurality of high brightness light emitting diodes disposed along at least two of said peripheral side edges in longitudinally spaced apart relation, each disposed in a respective one of said apertures for transmitting light directly into said panel;
    a layer of reflective material on at least said back surface of said panel to facilitate reflection and dispersion of light that occurs within said panel through said front surface;
    a rectangular frame having a generally U-shaped transverse cross section supported on said translucent panel surrounding said outer peripheral side edges of said panel and enclosing said light emitting diodes;
    said light emitting diodes electrically connected with a low voltage direct current rectifier or driver that is connected with standard household alternating current to rectify and supply polarized constant direct current to the light emitting diodes; wherein
    light from said light emitting diodes is transmitted directly into the panel material from said at least two of said peripheral side edges and reflected internally therein causing light of a brightness sufficient to provide general lighting illumination in a home or office to be emitted through said front surface under the influence of total internal reflection.

2. The lighting fixture according to claim 1, further comprising:
    a rechargeable backup battery connected with said direct current rectifier or driver and the standard household alternating current to be constantly charged thereby to provide power to the light emitting diodes in the event of a power failure.

3. The lighting fixture according to claim 1, further comprising:
    a remote control signal receiver connected with said direct current rectifier or driver to control the operation of said light emitting diodes in response to control signals transmitted by a hand-held remote control signal transmitter, and thereby allow said light emitting diodes to be turned on and off and the light intensity thereof to be selectively controlled from a remote location by a human operator.

4. The lighting fixture according to claim 1, wherein
said high brightness light emitting diodes comprise a plurality of high brightness light emitting diodes that emit light in various different colors; whereby
various color groups of light emitting diodes are selectively turned on or off or dimmed to produce different colors and hues of illumination and achieve customized and dynamic lighting effects.

5. The lighting fixture according to claim 4, wherein
said high brightness light emitting diodes are electrically connected with an alarm device; whereby
various color groups of light emitting diodes are selectively turned on or off to produce different colors or hues responsive to activation of the alarm device to provide a visual alarm signal in the event of an emergency situation.

6. The lighting fixture according to claim 1, further comprising:
    a layer of reflective material on said opposed peripheral side edges to facilitate reflection and dispersion of light that occurs within said panel through said front surface.

7. The lighting fixture according to claim 1, wherein
said panel front surface is smooth and polished for optimal transmission of light.

8. The lighting fixture according to claim 1, wherein
said panel is formed of translucent material containing a sufficient amount of phosphor material to facilitate radiation of absorbed light that occurs within said panel through said front surface.

9. The lighting fixture according to claim 1, wherein
either of said panel front surface or said back surface is provided with an uneven surface finish to facilitate diffusion of light that occurs within said panel.

10. The lighting fixture according to claim 1, wherein
said lighting fixture is a ceiling light fixture; and
said generally flat planar panel is a generally rectangular translucent panel sized and shaped to be installed in a ceiling of a home or office.

* * * * *